United States Patent
Siddhamalli

(10) Patent No.: US 8,034,873 B2
(45) Date of Patent: Oct. 11, 2011

(54) IN-SITU PLASTICIZED THERMOPLASTIC POLYURETHANE

(75) Inventor: Sridhar K. Siddhamalli, Strongsville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 716 days.

(21) Appl. No.: 11/566,875

(22) Filed: Dec. 5, 2006

(65) Prior Publication Data
US 2008/0085988 A1 Apr. 10, 2008

Related U.S. Application Data

(60) Provisional application No. 60/828,477, filed on Oct. 6, 2006.

(51) Int. Cl.
*C08F 2/44* (2006.01)
(52) U.S. Cl. ........ 524/773; 524/774; 524/775; 524/871; 525/440.01; 525/454; 528/363; 528/368
(58) Field of Classification Search .................. 525/444, 525/454, 440.01; 524/774, 775, 871, 773; 528/363, 368
See application file for complete search history.

(56) References Cited

U.S. PATENT DOCUMENTS

| | | | | |
|---|---|---|---|---|
| 3,233,025 A * | 2/1966 | Frye et al. | | 264/141 |
| 3,378,511 A * | 4/1968 | Newton | | 524/775 |
| 4,131,731 A | 12/1978 | Lai et al. | | |
| 4,608,418 A | 8/1986 | Czerwinski et al. | | |
| 5,908,894 A * | 6/1999 | Genz et al. | | 524/590 |
| 6,777,466 B2 | 8/2004 | Eckstein et al. | | |
| 6,780,271 B1 * | 8/2004 | Burmeister et al. | | 156/244.11 |
| 2008/0004388 A1 | 1/2008 | Malz et al. | | |

FOREIGN PATENT DOCUMENTS

| | | |
|---|---|---|
| EP | 1108735 A1 | 6/2001 |
| GB | 2028356 A | 3/1980 |
| WO | 2006010542 A1 | 2/2006 |

OTHER PUBLICATIONS

BASF Technical Leaflet [online], Jan. 2008, supersedes edition dated Jan. 2005 [retrieved on Feb. 24, 2009]. Retrieved from the Internet<URL: http://www.hexamoll.com/icms/basf_6/en/dt.jsp?setCursor=1_216945_217361>.*
Material Safety Data Sheet for 1,6-hexanediol [online]. Accessed via the Internet [Retrieved on Feb. 27, 2009], URL:<https://fscimage.fishersci.com/msds/59441.htm>.*
Material Safety Data Sheet for diphenylmethane 4,4'-diisocyanate [online]. Accessed via the Internet [Retrieved on Feb. 27, 2009], URL:<http://www2.hazard.com/msds/mf/cards/file/0298.html>.*
Material Safety Data Sheet for polyethylene adipate [online]. Accessed via the Internet [Retrieved on Feb. 27, 2009], URL:<https://fscimage.fishersci.com/msds/98214.htm>.*
Material Safety Data Sheet for benzyl butyl phthalate [online]. Accessed via the Internet [Retrieved on Feb. 27, 2009], URL:<http://www2.hazard.com/msds/f2/bhy/bhyrk.html>.*
Lokensgard, E.; Industrial Plastics: Theory and Application; 1997; Delmar Learning; p. 110.*
Wypych, G.; Handbook of Plasticizers; 2004; ChemTec Publishing; p. 346-354.*
Giles, H.; Wagner, J.; Extrusion: The Definitive Processing Guide and Handbook; 2005; Wm. Andrew Publishing; p. 115-123 and 311-321.*
Wypych, G.; Handbook of Plasticizers, 2004, p. 36-43 and 346-354.*

* cited by examiner

*Primary Examiner* — David W Wu
*Assistant Examiner* — Robert Jones, Jr.
(74) *Attorney, Agent, or Firm* — Joe A. Powell

(57) ABSTRACT

In-situ plasticized thermoplastic polyurethane (TPU) compositions are made by a process which involves reacting a polyol, glycol chain extender and a polyisocyanate where the reaction is conducted in the presence of a plasticizer. The reactants together with the plasticizer are added to a reaction extruder and reacted to form the in-situ plasticized TPU.

25 Claims, No Drawings

IN-SITU PLASTICIZED THERMOPLASTIC POLYURETHANE

CROSS-REFERENCE TO RELATED APPLICATION

This application claims priority from Provisional Application Ser. No. 60/828,477 filed on Oct. 6, 2006.

FIELD OF THE INVENTION

The present invention relates to thermoplastic polyurethane (TPU) compositions which use in-situ plasticized TPU, and more particularly to a process to produce in-situ plasticized thermoplastic polyurethane compositions. The TPU compositions are useful for applications where soft TPU having good cold snap-back properties are desirable.

BACKGROUND OF THE INVENTION

It is sometimes desirable to add plasticizer to TPU formulations to make the TPU softer. The prior art method to add plasticizer to TPU is to melt mix the plasticizer into the TPU using compounding equipment such as twin screw extruders, and the like, or to swell the TPU pellets with the plasticizer in a heated blender. The compounding step involves an extra operation and adds to the cost of making the final composition. Putting the TPU through an additional melt mixing step can also reduce the molecular weight of the TPU polymer. Plasticizers can also have a tendency to bleed out of the TPU composition, which can cause other problems. It has also been observed that TPU products having plasticizer added by conventional methods exhibit slow snap-back when exposed to cold temperatures.

It would be desirable to have a TPU composition that is plasticized without having to go through a compounding step and to improve the cold temperature properties, especially cold snap-back, of the TPU.

SUMMARY OF THE INVENTION

It is an object of this invention to produce a TPU composition having from about 5 to about 50 weight percent of plasticizer and to exhibit improved cold temperature properties.

The TPU composition is made by an in-situ process whereby the plasticizer is present when the reactants that form the TPU polymer are reacted.

The most preferred process involves first mixing the desired plasticizer with at least one polyol in a heated vessel to create a mixture of polyol and plasticizer. The heated mixture containing polyol and plasticizer is fed to a premixer along with the additional reactants to form a TPU polymer (polyisocyanate and glycol chain extender); the reactants and plasticizer are added to the heated mixture prior to the heated mixture passing into a pre-mixer device. All the reactants and plasticizer are mixed together in the pre-mixer and fed to a twin screw extruder. The TPU reactants are reacted in the twin screw extruder in the presence of a plasticizer to form an in-situ plasticized TPU polymer. An alternate process involves first mixing the plasticizer with the glycol chain extender reactant before adding the reactants to the twin screw extruder reactor.

A further alternative process is to inject the plasticizer into the extruder reactor while the reaction between the reactants (polyol, glycol chain extender, and polyisocyanate) is occurring.

The most preferred process is to first mix the plasticizer with the polyol as described above.

DETAILED DESCRIPTION OF THE INVENTION

The thermoplastic polyurethanes (TPU) compositions of the present invention comprise at least one TPU polymer along with at least one plasticizer.

The TPU polymer type used in this invention can be any conventional TPU polymer that is known to the art and in the literature as long as the TPU polymer is capable of imparting the desired mechanical and physical properties to the final composition.

The TPU polymer composition also comprises at least one plasticizer. The plasticizer may be used at any desired level, depending on the final composition properties desired. Typical levels of plasticizer are from about 5 to about 50, preferably about 10 to about 40, and more preferably from about 15 to about 35 weight percent of the TPU composition.

The type of plasticizer used can be any of the known plasticizers for use in TPU. The most common plasticizer types used are phthalates with butyl benzyl phthalate being the most preferred. Plasticizers used in the present invention can include phthalate based plasticizers, such as, di-n-butylphthalate, di-2-ethylhexyl phthalate (DOP), di-n-octyl phthalate, diisodecyl phthalate, diisooctyl phthalate, octyldecyl phthalate, butylbenzyl phthalate, and di-2-ethyhexyl phosphate isophthalate; aliphatic ester-based plasticizers, such as di-2-ethylhexyl adipate (DOA), di-n-decyl adipate, diisodecyl adipate, dibutyl sebacate, and di-2-ethylhexyl sebacate; pyrometallitate-based plasticizers, such as trioctyl trimellitate and tridecyl trimellitate; phosphate-based plasticizers, such as tributyl phosphate, tri-2-ethylhexyl phosphate, 2-ethylhexyldiphenyl phosphate, and tricresyl phosphate; epoxy-based plasticizers, such as epoxy-based soybean oil; and polyester-based polymer plasticizers. For applications that are sensitive from the toxicological point of view, such as children's toys and food contact, di-isononyl-cyclohexane-1, 2-dicarboxylate (Hexamoll® DINCH from BASF) may be used as the plasticizer. A single plasticizer may be used or a combination of two or more plasticizers may be used. The selection of the desired plasticizer will depend on the end use application of the TPU polymer, as is well understood by those skilled in the art of formulating TPU.

For purposes of this Specification, plasticizers are defined as material which soften the TPU but do not enter into the reaction which forms the TPU. Therefore, plasticizers should not have functional groups that chemically react with the isocyanate or with the hydroxyl groups of the polyol or glycol chain extender during the normal reaction to form the TPU.

For some applications, auxiliary additives may be used in the TPU compositions of this invention. Additives such as colorants, antioxidants, antiozonates, light stabilizers, and the like may be used in the TPU composition. Preferably, auxiliary additives are present in small amounts, such as from 0 to 5, and more preferably from 0.1 to 1 weight percent of the TPU composition. Inert fillers, such as talc, clay, calcium carbonate and the like, may be used in amounts of from 0 to 50 weight percent of the TPU composition. Preferably, inert fillers are not present in the TPU composition. If flame and smoke retardants are used, they are typically present in amounts of from 5-50 weight percent of the TPU composition.

The TPU polymer may be prepared by reacting a polyisocyanate with an intermediate such as a hydroxyl terminated polyester, a hydroxyl terminated polyether, a hydroxyl terminated polycarbonate or mixtures thereof (hydroxyl terminated intermediates are commonly referred to as polyols), with one or more glycol chain extenders, all of which are well known to those skilled in the art. U.S. Pat. No. 6,777,466 to Eckstein et al. provides detailed disclosure of processes to provide certain TPU polymers that may be utilized in embodiments of the present invention and is incorporated herein in its entirety.

The TPU polymer type used in this invention can be any conventional TPU polymer that is known to the art and in the literature as long as the TPU polymer has adequate molecular weight. The TPU polymer is generally prepared by reacting a polyisocyanate with an intermediate such as a hydroxyl terminated polyester, a hydroxyl terminated polyether, a hydroxyl terminated polycarbonate or mixtures thereof (polyols), with one or more chain extenders, all of which are well known to those skilled in the art. Polyester TPUs are the preferred TPU.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from, -caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 500 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 discloses hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

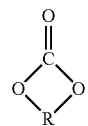

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyglycol, and the like, with 1,4-butanediol being preferred.

The desired TPU polymer used in the TPU composition of this invention is generally made from the above-noted intermediates such as a hydroxyl terminated polyesters, polyether, or polycarbonate, preferably polyester, which is further reacted with a polyisocyanate, preferably a diisocyanate, along with extender glycol desirably in a so-called one-shot process or simultaneous coreaction of polyester, polycarbonate or polyether intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer is generally about 50,000 to 800,000, and preferably from about 90,000 to about 450,000 Daltons. The equivalent weight amount of diisocyanate to the total equivalent weight amount of hydroxyl containing components, that is the hydroxyl terminated polyester, polyether, or poycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI.

The desired TPU polymer utilized in the TPU composition is generally made from the above-noted intermediates in a so-called one-shot process or simultaneous co-reaction of polyester, polycarbonate or polyether intermediate; polyisocyanate; and chain extender to produce a high molecular weight linear TPU polymer.

In the one-shot polymerization process which generally occurs in situ, a simultaneous reaction occurs between three components, that is, the one or more intermediates, the one or more polyisocyanates, and the one or more chain extenders, with the reaction generally being initiated at temperatures of from about 100° C. to about 120° C. Inasmuch as the reaction is exothermic, the reaction temperature generally increases to about 220° C.-250° C. The TPU polymer may be pelletized following the reaction. The reaction may be catalyzed by the use of any known urethane catalyst such as tin compounds and the like, which is well understood by those skilled in the art.

One unique feature of the process of this invention to make in-situ plasticized TPU is that the plasticizer is present during the reaction of the polyol, polyisocyanate and chain extender glycol. In the most preferred method, this is accomplished by mixing the plasticizer with the polyol in the heated polyol feed tank. The polyol containing the plasticizer is then mixed with the polyisocyanate and the glycol chain extender by any known means, but preferably the ingredients are fed to a pre-mixer. The stream containing all of the reactant components, together with the plasticizer, is then fed to a twin screw extruder in the one-shot process described above.

An alternate process to obtain the in-situ plasticizer TPU compositions is to add the plasticizer into the extruder through a port in the extruder barrel. For this alternate process, preferably, the plasticizer is added near the feed end of the extruder to assure complete mixing. The most preferred method of adding the plasticizer is to mix the plasticizer with the polyol before adding to the extruder, as is described above.

A further alternate process to obtain the in-situ plasticized TPU is to mix the plasticizer with the glycol chain extender and follow the same procedure as described above for the most preferred method of mixing the plasticizer with the polyol.

Any of the methods described above can be used to make in-situ plasticized TPU, with the important feature being that the plasticizer is present and dispersed with the reactants when the reaction between the polyol, chain extender, and polyisocyanate occurs.

In the in-situ process of this invention, it is desirable to pre-heat the reactants and the plasticizer prior to introducing them to the extruder reactor. The pre-heating allows the reaction to proceed faster. The reactants and plasticizer can be heated to greater than 80° C. up to a temperature normally observed during the reaction, such as about 220° C.

Although the process of this invention can be used to plasticize any TPU, it is especially useful to make soft TPU, such as TPUs having a Shore A durometer of from 60 to 75A. Soft TPUs, such as 60 to 75 Shore A, are difficult to produce with reactants alone on production equipment, because of their soft and sticky nature. For this reason, it has been the practice to mix plasticizer with a fully formed TPU to make the TPU softer. The use of the in-situ process of this invention allows soft TPU to be produced on standard TPU manufacturing equipment in a one step process.

The in-situ plasticized TPU of this invention can be used in any application desiring plasticized TPU, such as but not limited to, extruded hose, belts and film, as well as molded products such as shoes and various molded articles.

The invention will be better understood by reference to the following examples.

EXAMPLES

Example I

This Example is presented to show a process for producing an in-situ polyester TPU containing 20 wt. % plasticizer according to this invention. The polymerization recipe used was:

| | |
|---|---|
| Polyester Polyol | 50.9251 wt. % |
| Plasticizer* | 20.0000 wt. % |
| 1,4 Butanediol (BDO) | 6.1490 wt. % |
| MDI | 22.1867 wt. % |
| Additives** | 0.7392 wt. % |
| Total = | 100.00% |

*Butyl Benzyl Phthalate Plasticizer (Saniticizer ® 160)
**Stabilizers for heat and UV The process was conducted by mixing the plasticizer and additives with the polyester polyol in a heated tank and heated to 268° F. The MDI was heated to 237° F. The BDO was heated to 120° F. The polyol/plasticizer/additives mixture, MDI and BDO, were fed to a pre-mixer to thoroughly mix the reactants and plasticizer. The resulting mixture was then passed to the feed section of a heated twin-screw reactor extruder. The temperature of the extruder was set at from 376-400° F. The reactants (polyol, BDO and MDI) were reacted in the extruder in the presence of the plasticizer to create an in-situ plasticized TPU. The TPU polymer exited the extruder and was palletized for further use. The TPU produced by this Example had a Shore A durometer of 72.

Example II

This Example is presented to show a process for producing an in-situ polyester TPU containing 30 wt. % plasticizer according to this invention. The polymerization recipe used was:

| | |
|---|---|
| Polyester Polyol | 44.5336 wt. % |
| Plasticizer | 30.0000 wt. % |
| BDO | 5.3774 wt. % |
| MDI | 19.4025 wt. % |
| Additives | 0.6865 wt. % |
| Total = | 100.00% |

The process was conducted similar to Example I above. The plasticizer and additives were mixed with the polyol in a heated tank and heated to 430° F. The MDI was heated to 240° F. The BDO was heated to 120° F. The polyol/plasticizer/additives mixture, MDI and BDO, were fed to a pre-mixer to thoroughly mix the reactants and plasticizer. The resulting mixture was then passed to the feed section of a heated twin-screw reactor extruder. The temperature of the extruder was set at from 375-400° F. The reactants (polyol, BDO, and MDI) were reacted in the extruder in the presence of the plasticizer to create an in-situ plasticized TPU. The TPU polymer exited the extruder and was pelletized for further use. The TPU produced by this Example II had a Shore A durometer of 65.

Example III

This Example is presented to show the unexpected properties, at cold temperatures, of the in-situ plasticized TPU made according to Example I. The TPU of Example I is compared with the identical plasticized TPU made by a prior art method. Both TPUs have 20 wt. % plasticizer. The prior art TPU has the plasticizer added after the TPU is produced. In the prior art method, the plasticizer is added by swelling the plasticizer into TPU pellets using a heated ribbon blender.

To demonstrate the superior cold temperature properties of the TPU of Example I, the Gehman's rigidity modulus test is performed. This test measures the room temperature modulus of the TPU and then measures the temperature necessary to achieve 2 times the room temperature modulus (T2) and the temperature necessary to achieve 5 times the room temperature modulus (T5). The colder the temperature, the greater the modulus for TPUs. The data is as follows in Table 1.

TABLE 1

| TPU | T2 | T5 |
|---|---|---|
| Prior Art TPU* | −2° C. | −20° C. |
| Example I TPU | −38° C. | −44° C. |

*Estane 58437 Shore A durometer of 85 from Noveon, Inc. with 20 wt. % Santicizer ® 160 plasticizer resulting in a TPU with 72 Shore A durometer.

From the data, it can be seen that the in-situ plasticized TPU of this invention (Example I TPU) required the temperature be lowered to −38° C. to achieve two times its modulus at room temperature, whereas the prior art TPU only required the temperature be lowered to −2° C. to achieve two times its room temperature modulus. This result was quite unexpected in that the two TPU compositions are the same (same reactants in same proportions, both have 20 wt. % of the same plasticizer, both are 72 A Shore hardness, and both made by the one-shot process on twin-screw extruders at the same reaction temperatures). Although the compositions are the same, there is a dramatic difference in flexibility at cold temperatures.

Example IV

This Example is presented to show an alternate test to show the excellent cold snap-back properties of the in-situ plasticized TPU of this invention. The TPU produced in Example I having 20 wt. % plasticizer added in-situ was extruded into a 0.030 inch thick sheet using a 1 inch Killion® extruder. A sample of the extruded sheet was folded in such a fashion as to form an edge along the machine direction. The open edge was then clipped to prevent it from opening and placed into a freezer set at −40° C. for about 16 hours. The sample was then removed from the freezer and the clip removed. The time required for the folded sheet to completely open up was measured. The sheet completely opened up in 15 seconds.

A sheet made from 20 wt. % plasticized TPU, with similar durometer, but made by a prior art method of adding the plasticizer to a fully reacted TPU would require at least twice the time to fully open up after exposure to −40° C. temperature as described The TPU compositions made by the in-situ process of this invention have better cold temperature snapback than TPU compositions having the same level of plasticizer made by the prior art processes. TPU compositions made by the in-situ process of this invention also are believed to exhibit better permanency of the plasticizer that is less likely to bleed out plasticizer. The TPUs of this invention have a less oily feel on the surface than TPUs plasticized by conventional processes.

While in accordance with the Patent statutes, the best mode and preferred embodiment has been set forth, the scope of the invention is not limited thereto, but rather by the scope of the attached claims.

What is claimed is:

1. A one-shot process conducted in a twin-screw extruder for producing an in-situ plasticized thermoplastic polyurethane composition consisting essentially of reacting:
    (a) at least one hydroxyl terminated intermediate;
    (b) at least one glycol chain extender; and
    (c) at least one polyisocyanate;
    wherein said (a), (b) and (c) are reacted in the presence of at least one plasticizer to form an in-situ plasticized thermoplastic polyurethane composition, and wherein said plasticizer does not enter into the reaction which forms the thermoplastic polyurethane.

2. A process of claim 1 wherein said hydroxyl terminated intermediate is a polyester.

3. A process of claim 2 wherein said glycol chain extender is 1,4-butanediol.

4. A process of claim 3 wherein said polyisocyanate is a diisocyanate.

5. A process of claim 4 wherein said plasticizer is a phthalate plasticizer.

6. A process of claim 5 wherein said phthalate plasticizer is butyl benzyl phthalate.

7. A process of claim 1 wherein said plasticizer is di-isononyl-cyclohexane-1,2-dicarboxylate.

8. A process of claim 1 wherein the amount of said plasticizer is from about 5 to about 50 weight percent of said thermoplastic polyurethane composition.

9. A process of claim 8 wherein the amount of said plasticizer is from about 10 to about 40 weight percent of said thermoplastic polyurethane composition.

10. A process of claim 9 wherein the amount of said plasticizer is from about 15 to about 35 weight percent of said thermoplastic polyurethane composition.

11. A one-shot process for producing a thermoplastic polyurethane composition comprising:
    (a) mixing at least one hydroxyl terminated intermediate with plasticizer in a heated vessel;
    (b) adding at least one polyisocyanate and at least one glycol chain extender into a stream of the said polyol mixed with plasticizer to create a mixed stream;
    (c) passing said mixed stream through a pre-mixer;
    (d) feeding the exit stream of said pre-mixer into the feed section of a twin-screw extruder; and
    (e) reacting said polyol, polyisocyanate, and chain extender to form an in-situ plasticizer thermoplastic polyurethane.

12. A process of claim 11 wherein said heated vessel is heated to a temperature of from about 80° C. to about 220° C.

13. A process of claim 12 wherein the amount of said plasticizer mixed with said hydroxyl terminated intermediate is such that the plasticizer is from about 5 to about 50 weight percent of said in-situ plasticized thermoplastic polyurethane.

14. A process of claim 13 wherein the amount of said plasticizer mixed with said hydroxyl terminated intermediate is such that the plasticizer is from about 15 to about 35 weight percent of said in-situ plasticized thermoplastic polyurethane.

15. A process of claim 11 wherein said in-situ plasticized thermoplastic polyurethane has a Shore A durometer of from about 60 A to about 75 A.

16. A process of claim 11 wherein said hydroxyl terminated intermediate is a polyester.

17. A process of claim 16 wherein said glycol chain extender is 1,4-butanediol.

18. A process of claim 17 wherein said polyisocyanate is a diisocyanate.

19. A one-shot process for producing an in-situ plasticized thermoplastic polyurethane composition consisting essentially of:
    (a) feeding the following reactants to a twin-screw extruder reactor:
        (i) at least one hydroxyl terminated intermediate;
        (ii) at least one glycol chain extender; and
        (iii) at least one polyisocyanate;
    (b) adding at least one plasticizer to said twin-screw extruder reactor; and
    (c) conducting the reaction of (i), (ii), and (iii) in the presence of said plasticizer.

20. A process of claim 19 wherein said reaction is conducted at a temperature of from about 200° C. to about 220° C.

21. A process of claim 20 wherein said plasticizer is heated to a temperature of from about 80° C. to about 220° C. prior to being added to said twin-screw extruder reactor.

22. A process of claim 21 wherein the amount of said plasticizer is from about 5 to about 50 weight percent of the in-situ plasticized thermoplastic polyurethane composition.

23. A process of claim 22 wherein said plasticizer is a phthalate plasticizer.

24. A process of claim 19 wherein said hydroxyl terminated intermediate is a polyester, and said polyisocyanate is a diisocyanate.

25. An in-situ plasticized thermoplastic polyurethane composition made by the process of claim 1 having improved snap-back properties at cold temperature.

* * * * *